United States Patent

[11] 3,624,502

[72] Inventor Earle R. Bunker
 Alhambra, Calif.
[21] Appl. No. 842,880
[22] Filed July 18, 1969
[45] Patented Nov. 30, 1971
[73] Assignee California Institute of Technology
 Pasadena, Calif.

[54] CORONA-ARCING DETECTING TEST SYSTEM USING ZENER DIODES
 4 Claims, 1 Drawing Fig.

[52] U.S. Cl. .................................................. 324/131,
 324/110, 324/115, 324/119
[51] Int. Cl. ...................................................... G01r 1/36,
 G01r 15/08, G01r 19/22
[50] Field of Search .......................................... 324/131,
 110, 119, 43, 158, 115; 307/318

[56] References Cited
UNITED STATES PATENTS
1,746,935 2/1930 Goodwin, Jr. ................ 324/119
2,981,888 4/1961 White, Jr. ..................... 324/115
2,269,584 1/1942 Eldredge ...................... 324/43 X
2,584,800 2/1952 Grisdale ....................... 324/119 X
2,945,950 7/1960 Midkiff ......................... 307/318 X
3,063,001 11/1962 White .......................... 307/318 X
3,409,824 11/1968 Makuh ......................... 324/158 X
FOREIGN PATENTS
1,264,611 5/1960 France ......................... 324/119
OTHER REFERENCES
" DC Meter Protection," The Capacitor; March– April, 1960; pages 3, 4, 5, 6, 7, 8, 9; copy in 324– 110.

Primary Examiner—Rudolph V. Rolinec
Assistant Examiner—Ernest F. Karlsen
Attorneys—Samuel Lindenberg and Arthur Freilich ABSTRACT: A corona detection and measurement apparatus is provided which detects AC, DC corona discharge or combinations of both, which balances out stray capacitance current, and which employs a sensitive corona current-measuring circuit with protection from possible damages due to arcing which may occur.

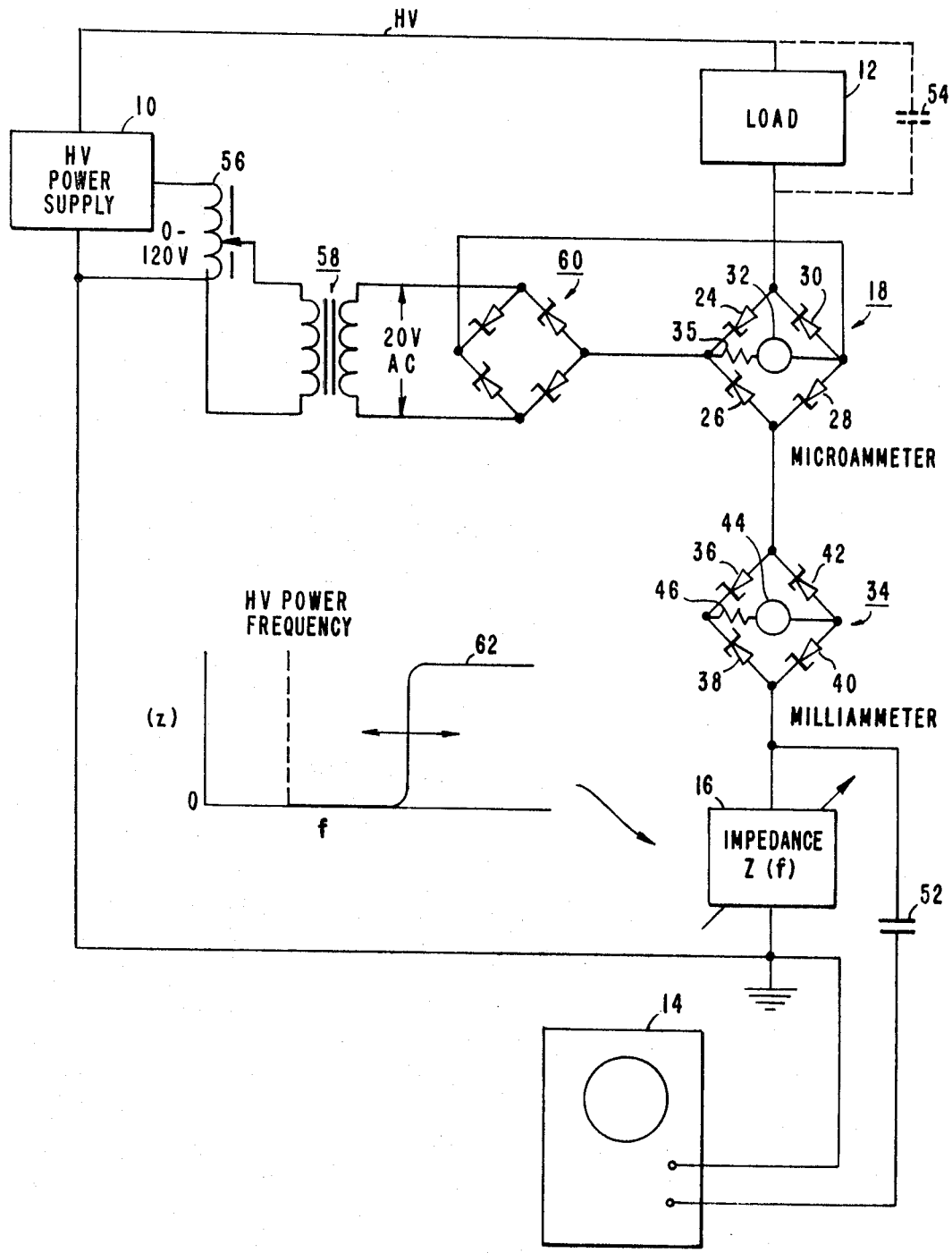

CORONA-ARCING DETECTING TEST SYSTEM USING ZENER DIODES

BACKGROUND OF THE INVENTION

This invention relates to test equipment for corona and arcing and more particularly to improvements therein.

For purpose of clarification in this disclosure corona is defined as a partial or high-impedance breakdown of the insulating dielectric between two or more conductors, in a high-voltage network while arcing is defined as a complete or low-impedance breakdown between the conductors, with the current flow limited by the power supply capability. While the main interest is usually the detection of corona in high-voltage equipment requiring sensitive measuring equipment, the possibility of arcing with its high-current surges, either continuous or intermittent, is always present.

Standard instrumentation for detection of corona breakdown in high-voltage networks typically has a shunt configuration in which a series-connected high-voltage capacitor and an inductor are connected in shunt with the high-voltage source and the test object. The capacitor is connected to the high-voltage side of the high-voltage source and the inductor is connected to the ground side of the high-voltage source. An oscilloscope connected across the inductor displays the presence of any corona.

While this arrangement works well for large rotating machinery and power equipment, it is not suitable for detection of corona in small components and subsystems which are used, for example, in spacecraft, and further, which are intended to operate under vacuum or low air pressures, (high-altitude conditions).

One limitation of such an arrangement is that the capacitor which is used must be corona free, as a discharge occurring within the capacitor is indistinguishable from a discharge occurring within the test object.

The shunt configuration is inherently incapable of reliably detecting DC corona discharge because it depends upon the detection of high frequency or radio noise generated in the test system. Under some conditions, DC corona can exist with no generation of radio noise.

OBJECTS AND SUMMARY OF THE INVENTION

A feature of this invention is the provision of corona detection test equipment which does not require the use of a shunt capacitor.

Another feature of the present equipment is the provision of an arrangement which is capable of indicating the presence of both AC and DC corona.

Still another is the provision of a corona detection system which is capable of detecting the presence of smaller corona currents that has been possible with the previously known corona detection systems.

Still another feature is the ability to detect corona between intermittent arcing pulses without damage to the more sensitive corona detection network.

Another feature is the capability of detection of the impingement of corona currents on various metallic surfaces electrically insulated from each other but eventually grounded at a common point by the use of a corona detection network in each ground return.

The foregoing and other features of the invention are achieved in an arrangement wherein high-voltage power is applied across a load connected in series with the corona indicating network. This is connected in series with an arcing-indicating network which is connected to ground through an impedance. An oscilloscope is connected across the impedance through a capacitor. Means are provided for bucking out stray currents which may occur through stray capacitance.

The indicating networks include zener diodes for bypassing currents which exceed the safe limit to which indicating meters in the networks can be exposed safely.

The novel features of the invention are set forth with particularity in the appended claims. The invention will best be understood from the following description when read in conjunction with the accompanying drawing.

BRIEF DESCRIPTION OF THE DRAWINGS

The drawing is a circuit diagram of an embodiment of the invention.

DESCRIPTION OF THE PREFERRED EMBODIMENTS

Referring to the drawing, a high-voltage power supply 10 has a high-voltage output terminal connected to a load 12 under test. The high-voltage supply ground terminal, is connected to the ground terminal of an oscilloscope 14 and a variable impedance 16.

A first detecting network 18 for detecting corona is connected to one end of the load 12 or to the enclosure. This first detecting network 18 includes a diode bridge arrangement consisting of four zener diodes 24, 26, 28, 30, and a microammeter 32, having one end connected to one terminal of the bridge and another end connected through a current-limiting resistor 34 to the other terminal of the bridge.

A second detecting network 34, for indicating the presence of an arc is connected in series with the first indicating network. The second indicating network includes four zener diodes respectively, 36, 38, 40, 42, which are also connected to the diode bridge arrangement. A milliammeter 44, has one end connected to one of the bridge terminals and the other end connected through a current-limiting resistor 46, to the opposite bridge terminal.

The arc-detecting network 34 is connected to the impedance 16. The impedance 16 may be variable, it may either be a simple inductance, or a complex band stop filter tuned to the line power frequency. The oscilloscope 14 may be connected through a capacitor 52 to the impedance 16.

The existence of stray shunt capacitance across the load 12 is designated by the dotted line capacitor 54, and it is shown as being connected across the load. Stray capacitance may be of consequence only when the load is being tested for AC corona at various frequencies. The effect of the stray capacitance is to provide an indication of current flow which can be misinterpreted as being due to corona. Stray capacitance effects may be balanced out by employing a bucking current which varies with the high voltage applied to the load. In accordance with this invention in a suitable arrangement an AC output voltage proportional to and lower than the high-voltage AC output is derived from the high-voltage power supply. This may be done, for example, by closely coupling a winding to the secondary winding of the high-voltage power supply transformer (not shown) to derive, for example, 120 volts AC for maximum high voltage.

This adjustable voltage is applied to an adjustable transformer 56. The output of the adjustable transformer is applied to a step down transformer 58. The output of the step down transformer is applied to a zener diode bridge 60 which converts the transformer 58 AC output to DC The DC bridge output is applied to the bridge 18 across the microammeter 32, with a polarity to oppose current flow through the meter due to bridge 18.

Prior to testing for corona, a high voltage is applied to the load 12 well below any possible value that can cause corona. Current flow through stray capacitance 54, will be indicated by the microammeter 32. The variable transformer 56 is adjusted from zero upward until the stray capacitance current is bucked out and the microammeter reads zero. Since the bucking current is derived from a voltage proportional to the high-voltage power supply output, as this value is increased for the corona test, the bucking current should increase to oppose the increase in stray capacitance current that will occur.

The microammeter 32 and the milliammeter 44 may be of a conventional indicating type or of the meter relay type. Use of the meter relay type makes it possible to utilize the built-in relay contacts to disable the high-voltage source after overload occurs in either meter circuit and thus makes possible unattended operation of the system for long periods when this is desirable.

In normal operation, on the assumption that the polarity of the corona discharge (either DC or one-half cycle of an AC discharge) is positive at the junction of diodes 24 and 30, current will then flow through diode 24 in a forward direction, through the resistor 34 (which may be on the order of 2 megohms), through the microammeter 32, diode 28 in forward direction, and then through secondary winding 18. Current will also flow through diode 36, resistor 46, (which is on the order of 10,000 ohms) the milliammeter 44, diode 40, and through the impedance 16 to ground.

By way of illustration, a microammeter range which was chosen was 5 microamperes and a selected milliammeter range was 1 milliamperes. The reverse breakdown voltage of the selected zeners was 10 volts. When more than 5 microamperes of corona current flowed through resistance 34, or more than 1 milliampere flowed through resistor 46, the zeners conducted in a reverse direction. When corona discharge or arcing in excess of 5 microamperes occurs, two parallel paths around the microammeter are set up, one being through forward-conducting diode 24 and the, now reverse-conducting diode, 26. The other path exists through now reverse-conducting diode 30 and forward-conducting diode 28. Since the zener breakdown is extremely rapid, a fast acting bypass arrangement is thus set up which shunts excessively high current around the meter and prevents damage.

The microammeter is bypassed as long as the zener diodes remain in reverse breakdown conduction, and readable corona or arcing current is then indicated on the milliammeter, until the current applied to the milliammeter produces a voltage which exceeds the breakdowns of zeners 38 and 42. When this occurs, a similar pair of bypass paths are established to protect the milliammeter. Since arc currents build up rapidly from a fraction of a milliampere to many amperes, such meter protection is essential.

On the assumption that the polarity of the corona discharge current at the junction of diodes 24 and 30 is negative, which might be the case for a DC corona discharge, but would certainly be the case for the next half cycle of an AC discharge, then current would flow as follows. The path would be through diode 38 in a forward direction. The current would then flow through diode 26, resistor 34, through the microammeter, and through the diode 30 and then through the load. It should now be likewise appreciated that should the reverse breakdown voltage of diodes 36, 40, 24 and 28 occur, then protective bypassing of the meters would be provided.

It will be seen that the bridges are arranged so that regardless of whether the corona discharge or arcing is of the DC or AC type, an appropriate DC current indication will be given, and therefore the arrangement shown is capable of detecting both AC and DC corona.

An indication of the corona discharge is also given simultaneously by the oscilloscope connected across the impedance 16, which displays RF noise voltage generated by the discharge. One possible frequency versus amplitude characteristic of the impedance 16 is shown by the curve 62. At line power frequency and nearby harmonics, impedance is essentially zero, rising to a steep value in the higher RF region.

When detecting AC corona discharge, as voltage increases, the effect of stray capacitance in the test object and associated wiring, allows a certain constant percentage of the applied AC test voltage to flow around the test object to the corona detection network. In those cases in which stray capacitance is high, this flow of current can obscure any corona discharge being generated. The undesired stray capacitance current is nulled by the arrangement shown.

There has accordingly been described herein a novel and useful system which makes possible to detect both AC and DC corona discharge or combinations of both simultaneously.

What is claimed is:

1. A circuit for detecting corona established across a load by voltage from a high-voltage supply comprising:
   a first detecting circuit for detecting corona current connected in series with said load,
   said first detecting circuit including means for bypassing corona current exceeding a predetermined level,
   a second detecting circuit for detecting arcing current having a value higher than that detected by said first detecting circuit,
   said second detecting circuit including means for bypassing corona or arcing current exceeding a predetermined level,
   means connecting said second detecting circuit in series with said first detecting circuit,
   an impedance connected in series with said second detecting circuit,
   means for applying voltage from said high-voltage supply across said series connected load, first and second detecting circuits, and said impedance,
   means for generating a bucking current proportional to the voltage from said high-voltage supply, and
   means for applying said bucking current to said first detecting circuit for opposing any current arising by the existence of a stray shunt capacitance across the load.

2. A circuit as recited in claim 1 wherein said first and second detecting circuits each comprise:
   a diode bridge network wherein each diode of said bridge network is a zener diode which has the characteristic that it will permit reverse current flow in the presence of a back voltage exceeding a predetermined level,
   a meter, and
   means connecting said meter across said diode bridge network to enable it to measure corona current flowing through said bridge as long as there is no reverse current flow.

3. A circuit for detecting corona established across a load by voltage applied thereacross by a high-voltage supply including:
   two diode bridge circuits connected in series with each other and in series circuit with said load and said high-voltage supply,
   the diodes of said diode bridge circuits comprising zener diodes, said zener diodes having a characteristic that they will permit a reverse current flow in the presence of a back voltage exceeding a predetermined level,
   a meter for each diode bridge circuit,
   means for connecting each meter respectively across each respective diode bridge circuit for measuring current flow through each respective bridge circuit as long as the voltage across the zener diodes of the respective bridge circuits do not exceed said predetermined level,
   means for deriving from said high-voltage supply a bucking current proportional to the voltage from said high-voltage supply, and
   means for applying said bucking current to one of said meters to oppose any current arising by reason of the existence of the stray shunt capacitance across the load.

4. A circuit as recited in claim 3 wherein said means for deriving a bucking current from said high-voltage supply proportional to the voltage from said high voltage includes variable transformer means for deriving a stepped down voltage from said high-voltage supply, and
   means for rectifying said stepped down voltage.

* * * * *